United States Patent [19]

Luce

[11] 3,955,355

[45] May 11, 1976

[54] ELECTRONIC CALCULATOR WATCH STRUCTURES

[75] Inventor: Nunzio A. Luce, Trenton, N.J.

[73] Assignee: Optel Corporation, Princeton, N.J.

[22] Filed: Mar. 27, 1974

[21] Appl. No.: 455,378

[52] U.S. Cl. ............................ 58/50 R; 58/152 R; 235/156
[51] Int. Cl.² .................. G04B 19/30; G04B 37/12; G06F 7/38
[58] Field of Search ............. 58/50 R, 152; 235/156

[56] References Cited
UNITED STATES PATENTS

| | | | |
|---|---|---|---|
| 3,672,155 | 6/1972 | Bergey et al. | 58/50 R |
| 3,676,801 | 7/1972 | Musa | 58/23 A |
| 3,803,834 | 4/1974 | Reese | 58/152 R |
| 3,813,533 | 5/1974 | Cone et al. | 58/152 R |

*Primary Examiner*—Edith Simmons Jackmon
*Attorney, Agent, or Firm*—Joel F. Spivak

[57] ABSTRACT

There is disclosed an integral instrument providing timekeeping and display with calculator functions and display accomplished by means of a keyboard assembly mounted on the watch casing and adapted to be worn about a user's wrist. Included is time sharing circuitry to enable common display drivers for the timekeeping and calculating modes as well as power sharing circuitry to enable the use of inexpensive and reliable P-MOS circuitry in the calculator mode without constantly dissipating power. A time-zone setting circuit utilizes logic circuitry to automatically enable the user to change time by direct access to the existing keyboard assembly.

15 Claims, 9 Drawing Figures

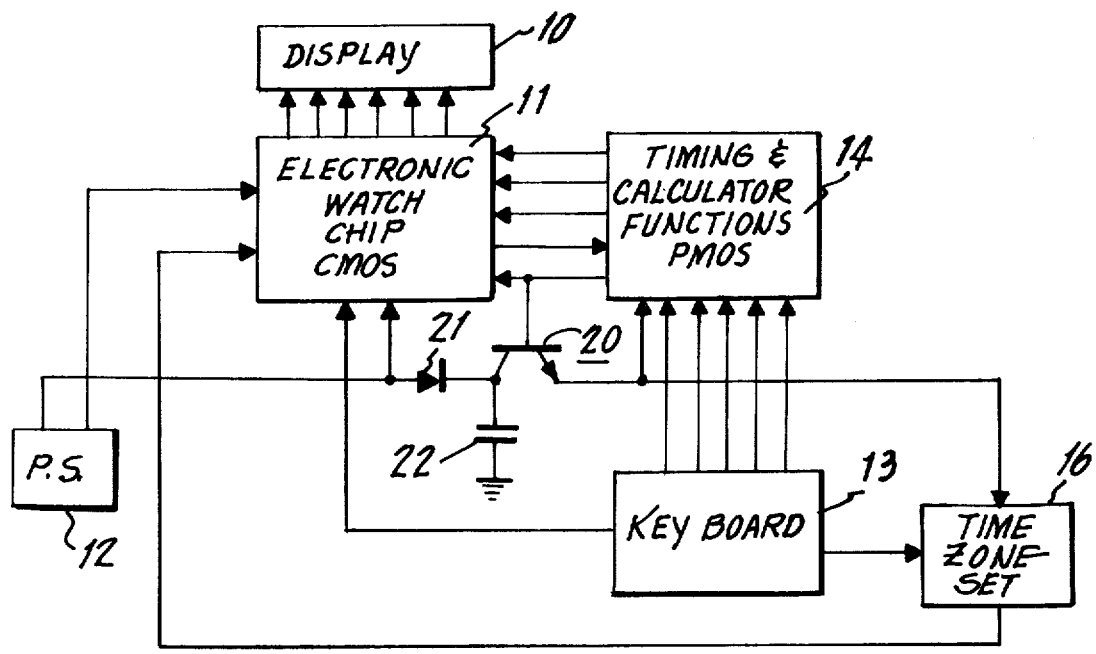
Fig. 1.
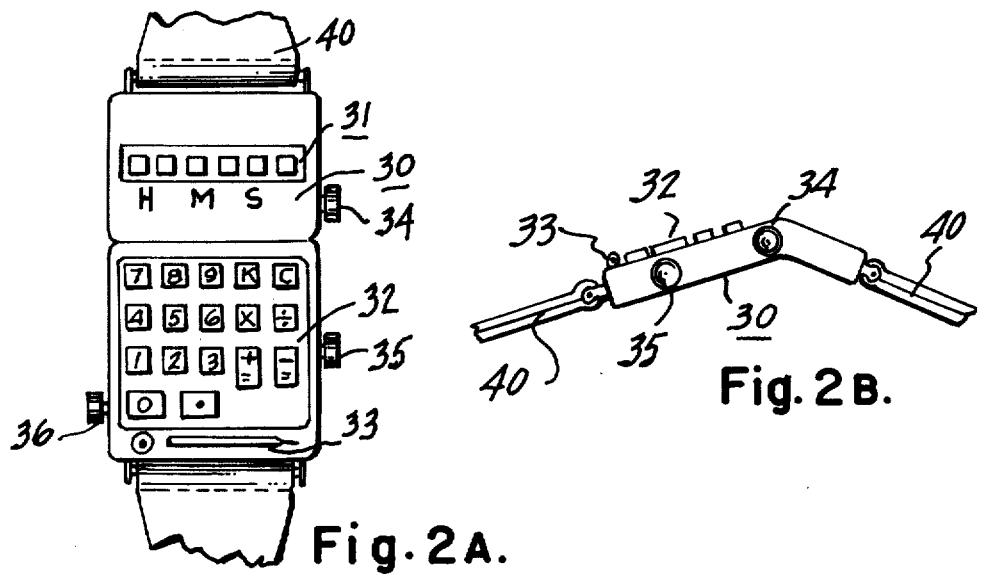
Fig. 2A.
Fig. 2B.

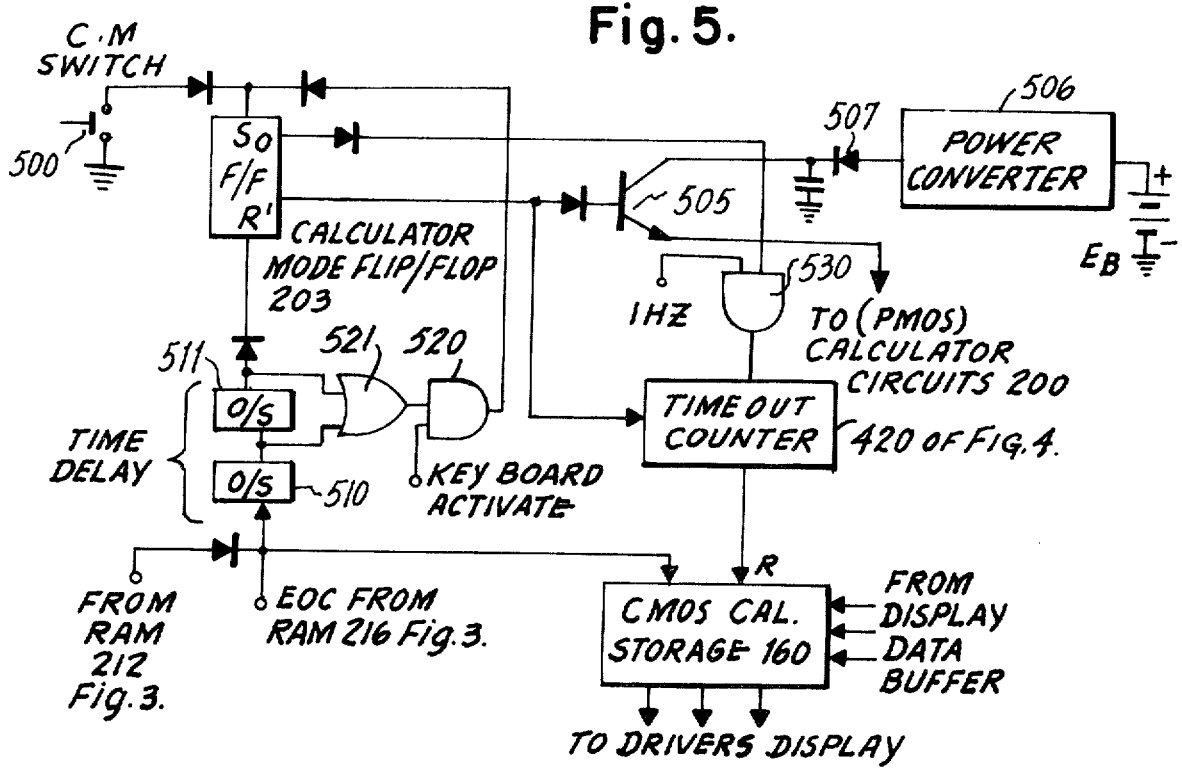

Fig. 6B.

| TIME DIFF. → <br> AM/PM ↓ | 0 <br> N.Y. | -1 <br> CHIC-AGO | -2 <br> DEN-VER | -3 <br> SAN.F. | -4 <br> JUN-EAU | -5 <br> HON. | -9 <br> SYD-NEY | -10 <br> TOYKO | +1 <br> BUENOS AIRES | +5 <br> LONDON | +6 <br> GENEVA | +7 <br> CAIRO | +11 <br> CAL-CUTTA |
|---|---|---|---|---|---|---|---|---|---|---|---|---|---|
| 12:00 | 0000 | 1011 | 1010 | 1001 | 1000 | 0111 | 0011 | 0010 | 0001 | 0101 | 0110 | 0111 | 1011 |
| 1:00  | 0001 | 0000 | 1011 | 1010 | 1001 | 1000 | 0100 | 0011 | 0010 | 0110 | 0111 | 1000 | 0000 |
| 2:00  | 0010 | 0001 | 0000 | 1011 | 1010 | 1001 | 0101 | 0100 | 0011 | 0111 | 1000 | 1001 | 0001 |
| 3:00  | 0011 | 0010 | 0001 | 0000 | 1011 | 1010 | 0110 | 0101 | 0100 | 1000 | 1001 | 1010 | 0010 |
| 4:00  | 0100 | 0011 | 0010 | 0001 | 0000 | 1011 | 0111 | 0110 | 0101 | 1001 | 1010 | 1011 | 0011 |
| 5:00  | 0101 | 0100 | 0011 | 0010 | 0001 | 0000 | 1000 | 0111 | 0110 | 1010 | 1011 | 0000 | 0100 |
| 6:00  | 0110 | 0101 | 0100 | 0011 | 0010 | 0001 | 1001 | 1000 | 0111 | 1011 | 0000 | 0001 | 0101 |
| 7:00  | 0111 | 0110 | 0101 | 0100 | 0011 | 0010 | 1010 | 1001 | 1000 | 0000 | 0001 | 0010 | 0110 |
| 8:00  | 1000 | 0111 | 0110 | 0101 | 0100 | 0011 | 1011 | 1010 | 1001 | 0001 | 0010 | 0011 | 0111 |
| 9:00  | 1001 | 1000 | 0111 | 0110 | 0101 | 0100 | 0000 | 1011 | 1010 | 0010 | 0011 | 0100 | 1000 |
| 10:00 | 1010 | 1001 | 1000 | 0111 | 0110 | 0101 | 0001 | 0000 | 1011 | 0011 | 0100 | 0101 | 1001 |
| 11:00 | 1011 | 1010 | 1001 | 1000 | 0111 | 0110 | 0010 | 0001 | 0000 | 0100 | 0101 | 0110 | 1010 |
| 12:00 | 0000 | 1011 | 1010 | 1001 | 1000 | 0111 | 0011 | 0010 | 0001 | 0101 | 0110 | 0111 | 1011 |

BINARY HOUR

ELECTRONIC CALCULATOR WATCH STRUCTURES

BACKGROUND OF INVENTION

This invention relates to electronic calculator timepieces or watches incorporating calculator apparatus integrally associated with said timepiece circuitry, and more particularly, calculator apparatus to be used in conjuction with electronic watch circuitry to enable a user to perform arithmetic and other calculations by means of a compact, "wrist watch" or similar configuration.

The electronic wrist watch operating with digital logic circuitry is a relatively recent development afforded by technological advances. There is a virtual plethora of patents and technical articles which describe such timepieces and the subsequent advantages of the electronic digital watch as compared to its mechanical counterparts.

The frequency stability of such watches exceeds that of the mechanical devices due to the fact that its operation is dependent upon an accurate quartz, crystal oscillator. The oscillator in such a watch generates an 8, 16 or 32 KHz reference signal, which is conventionally divided in frequency by means of digital divider circuits, as cascaded bistable multivibrators to provide a 1 Hz or other "time-keeping" signal. This signal (1 Hz) is then counted by digital counters to determine seconds, minutes, and hours. The counters are associated with gates and storage display circuits used to illuminate a visual display, such as light emitting diodes or liquid crystals.

These watches, besides being reliable and attractive, offer accuracies of 10 seconds or less per month, a significant advance over the minute-per-month accuracy of conventional mechanical watches.

Since such devices are powered by a small battery, power consumption is a primary consideration in the design and fabrication of such a watch. The plurality of such watches use C/MOS or complimentary MOS integrated circuits and certain use low power liquid crystal displays to conserve power and assure operation of such a watch for periods up to and exceeding one year without battery replacement. Thus, the watch as utilized consumes about 30 microwatts or less in power continuously for about one year, therefore permitting the use of a small 1.5 volt hearing aid type battery. The advantages of complementary metal-oxide semiconductor (C/MOS) technology in such an electronic watch is great in that it has very low consumption, very high noise immunity and good switching speeds; but suffers from relatively high cost. In any event, since a watch is a fairly expensive item and since the costs are continuously decreasing due to new technology, the operating characteristics of C/MOS logic is well worth the expense.

When one investigates the applicability of housing a calculator and associated circuitry in a common enclosure with an electronic watch, one is faced with extremely more difficult problems.

Primarily, a calculator or device capable of performing arithmetic operations and calculations of that sort requires extensive circuit components, far greater in complexity and component count than that required for a watch. Hence, it is not economically feasible to utilize C/MOS circuitry. Therefore, one is required to use a less expensive form of logic circuitry which has to be compatible and operate in conjuction with the C/MOS clock circuitry. Such a form of circuitry is designated as P-channel metal oxide circuitry or P-MOS logic circuitry. The advantages of P-MOS circuitry is cost and chip size. Where a comparison in price is possible, it is apparent that P-MOS is 50% or more less expensive than C/MOS. P-MOS fabrication generally requires about five masking steps in fabricating the integrated circuit, while C/MOS, which can be viewed as a combination of P-channel MOS technology and N-channel MOS technology requires seven to eight masking steps. Another major consideration between C/MOS circuitry is in integrated circuit chip area. A C/MOS circuit, especially one of the repetitive type, as a shift register, may require 50% more total area than a P-MOS circuit. Thus, as circuit configurations become large, as in a calculator, C/MOS will require greater chip sizes than P-MOS circuitry. In addition, C/MOS requires more contacts than P-MOS.

In any event, a major consideration in the implementation of a calculator watch is to use as much circuitry as possible in common between the C/MOS clock circuits and the P/MOS calculator circuits. Furthermore, due to the increased power requirements of the P-MOS, use the circuitry as little as possible and only when necessary. This is to conserve power and enable the user to obtain the maximum battery life possible, while gaining the advantages of affording him extreme versatility due to the unique configuration of a calculator watch.

It is therefore an object of this invention to provide an integral calculator watch apparatus utilizing low cost economical logic configurations while maintaining relatively low power consumption.

BRIEF DESCRIPTION OF PREFERRED EMBODIMENT

An electronic calculator watch apparatus is of the type employing a direct reading digital display, timekeeping circuitry monitors an accurate frequency source to provide, at an output, a numerical indication of the time of day, which indication can be directly displayed on said display, calculator section is fabricated from higher power dissipating logic circuitry and includes an arithmetic keyboard or other keyboard format, said calculator operates in conjunction with said keyboard to perform algorithmic functions and provides an output indicative of the numerical result of the function to be displayed, the power supplied to energize the calculator mode is controlled such that power is removed and reapplied only during calculator operation, driving circuit means are shared by the calculator section and timekeeping sections to energize the display during the calculator mode permitting the time of day to be displayed at all other times.

A time zone circuit uses the calculator keyboard to enable a user to automatically set the watch display to any time zone desired and indicative of a particular destination, always in reference to the user's main time zone.

BRIEF DESCRIPTION OF FIGURES

FIG. 1 is a simple block diagram of an integral calculator watch assembly according to this invention.

FIGS. 2A and B are perspective diagrams of the front (A) and side (B) view of a calculator watch housing format.

FIG. 5 is a block diagram partly in schematic form showing the power control circuitry for calculator operation.

FIGS. 6A and 6B are two tables useful in explaining time zone conversion afforded by the apparatus.

DETAILED DESCRIPTION OF DRAWINGS

Figure 3:
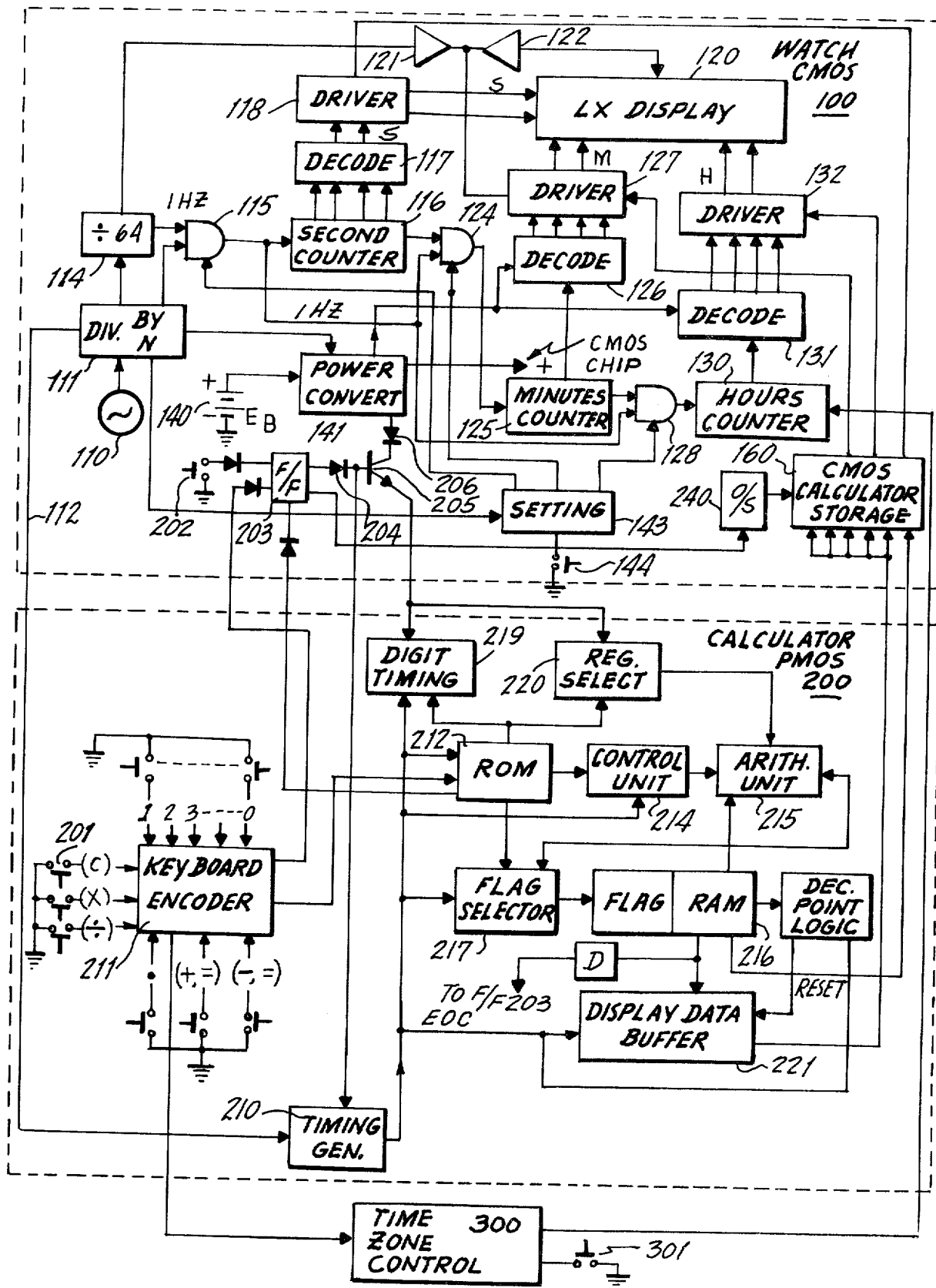
FIG. 3 is a detailed block diagram of the structure of a calculator watch assembly according to this invention.

Referring to FIG. 1, there is shown a simple block diagram of an Electronic calculator watch apparatus according to this invention.

The apparatus includes a direct reading display 10, which has provisions for displaying six digits. In terms of the time keeping process, the six digit display 10 could be used to display hours, minutes and seconds, each requiring two digits. The same display, as will be explained, is shared by the calculator module to display the results of mathematical computations up to, for example, 999,999. It is of course understood that additional display digits could be utilized if desired, by incorporating additional display units. Presently, a great number of different display devices are utilized as gas discharge devices, light emitting diodes (LEDs) and liquid crystals. Liquid crystal have certain advantages in that the power requirements are low, the life of the crystal is long and they can operate over a wide range of temperature. There are numerous examples of suitable liquid crystal displays in the prior art as well as the explanation of the segment approach to display numerals. Thus, while various other displays can be utilized, the display 10 is preferably a six digit segmented liquid crystal display. For a suitable explanation of such a display as well as a technique for energizing the same reference is made to U.S. Pat. No. 3,744,049 entitled LIQUID CRYSTAL DRIVING AND SWITCHING APPARATUS UTILIZING MULTIVIBRATORS AND BIDIRECTIONAL SWITCHES, patented on July 3, 1973, by Nunzio A. Luce, the applicant herein and assigned to assignee herein.

The display 10 is conventionally driven and energized by an electronic watch chip assembly 11, which is fabricated from C/MOS components. As indicated above C/MOS or complementary MOS integrated circuits have very low power dissipation, are completely compatible with liquid crystal displays and are relatively easy to provide for time keeping purposes.

The major functions and structures provided by the assembly 11 include a high frequency oscilliator as a frequency reference source. The oscillator may operate at about 36,768 Hz or higher and is crystal controlled to assure accuracy of about ±20 parts per million, thus assuring that the time deviation of the electronic watch will be less than 10 seconds per month! The oscillator frequency is divided down by conventional binary dividers to provide, for example, a 1 Hz signal. This signal is counted by a seconds counter, which is also a conventional divider, to thus store and count 60 counts to then provide an output pulse; which pulse is used to count minutes and the 60 minute pulse is used to count hours. Each of the second, minute and hour counters have stored therein the particular count manifesting the time. Thus, the contents of each counter are monitored and decoded by typical counter-decoder logic gates and are used to drive the respective display segments of display 10 to provide the user with a direct readout of time. Shown coupled to module 11 is a power source 12 (P.S.) which is typical 1.5 volt battery. The power supply 12 may include an up-converter circuit which translates the 1.5 volts to a higher voltage as 15 volts, for example. A 15 volt battery may also be used directly. In any event, the battery or power supply 12 can supply 30 microwatts of power or more for one year. The module 11 typically consumes about twentyseven microwatts of power less for continuous operation. In any event, better and more powerful batteries are available and this is no particular problem in regard to operating the watch circuits.

A calculator section 14 is shown and designated as TIMING and CALCULATOR FUNCTIONS P-MOS 14. The calculator section 14 includes the higher power P-MOS circuitry and essentially comprises an IC calculator chip. Such chips including an entire calculator function, as will be further explained, are commercially available. For example, a small micro-programmable MOS-LSI chip is available from Texas Instruments as TMS 0100. In any event the basic calculator, whether it be a hand-held unit or desk top device, is relatively simple as it includes, besides the IC chip, a keyboard (referenced as numeral 13), a display 10, a display interface circuit, which as will be seen, can be shared with the watch interface circuit, a power supply 12 and a case. The case, as will be seen with reference to FIG. 2, is common with the watch case, thus providing an integral calculator watch assembly. It is noted that the calculator assembly 14 has a common cable or lead connections with the electronic watch assembly 11 and vice-versa. The keyboard 13 also has cable connections between modules 11 and 14. Also shown coupled between the keyboard 13 and the electronic watch chip 11 is a module 16 designated as TIME ZONE set. The function of module 16 is to permit a user to automatically set the time of the watch according to any time zone he may be entering. The user can accommodate time zone setting by means of the keyboard 13 using existing circuitry with slight and economical modifications.

Also shown in FIG. 1 is a transistor switch 20. The device is shown as a NPN and has a collector electrode coupled via a diode 21 to the power supply 12. A capacitor 22 is coupled between the collector and a point of reference potential to act as a filter for power supply variations.

The emitter electrode of the transistor 20 is coupled to the timing and calculator function P-MOS module 14 and to the time zone setting module 16. The base electrode of transistor 20 is shown coupled to the TIMING and calculator function module 14 and to the watch module 11.

The transistor 20 provides the following functions. A indicated, battery drain or power supply dissipation is of a primary concern in regard to both the digital watch and the calculator. It is apparent that the lower the power consumption, the longer the power supply life.

In this regard, the P-MOS calculator chip or assembly 14 requires more power than the watch (C/MOS) circuitry 11. Since the user does not calculate continuously, there is no need to activate the module 14 during the electrode watch mode operation, which is, in fact, a continuous operation.

Furthermore, the power supplied to the calculator assembly 14 can be further monitored and controlled to assure that the unit will operate only when necessary and not on a continuous basis. This is true for the time zone setting circuitry 16 as well. Thus, the transistor 20 under control of the logic assemblies will operate as a switch to supply power to the calculator or heavy current circuits 14 during the appropriate modes. When transistor 20 is saturated, a voltage appears at its emitter electrode, directing power to the chip 14 and the module 16. Hence, one can combine operations of a calculator with a watch and retain the necessary long battery life to provide the user with a unique and reliable instrument.

Referring to FIG. 2A, there is shown a front perspective view of a particular calculator watch case 30. Essentially, a six digit display 31 is utilized and comprises a segmented liquid crystal assembly for low power consumption and good visibility. A lower portion of the case includes a typical keyboard 32. The keyboard 32 is ultra miniature and is a basic four function keyboard and includes the digit selector switches 0 to 9 and the functions switches K, C, X, ÷, .. (+,=) and (=,−). Also shown and removeably secured to the case 30 is a key depressor, pin or rod unit 33, which is used to permit the user to easily access each key of the board 32 as desired. The watch case has a profile or side view as shown in FIG. 2B to allow the same to conform to the average users wrist by a gradual bend. Typically, the case is approximately 1¾ inches long and about ¾ of an inch wide, thus conforming to average wrist dimensions. Also shown are setting stems or switches 34, 35 and 36. A watch band or strap 40 is shown in partial view and as such is any ordinary watch strap used to secure a watch to the wrist of a user. It is of course, understood that the concepts described herein have applicability to other arrangements as desk top instruments, hand-held instruments and so on, to provide the time keeping and calculating functions to be herein described. In order to obtain a clarification of function and to correlate the particular keyboard format, the following definitions are included for convenience and ease of explanation:

The functions of the digit keys (0) to (9) and the four principal arithmetic keys of (+,=), (−,=), × and ÷ are rather obvious and well known. The other keys of concern are:

(.) Decimal — serves to enter the decimal point initially at far right.

(k) Constant — permits a constant factor to be stored in memory or saved for further use in multiplication or division.

(c) Clear — clears entire calculator. It is of course understood that the above keyboard formation is only by way of example and there are virtually hundred of different functions one could add or utilize without departing from the concepts described.

The stem 34 serves as a setting switch for the clock circuits to enable a user to change the time when desired. The switch 35 is a calculator mode switch and enables the user to access the keyboard as desired and to perform calculations. The switch 36 is a time zone setting switch and enables the user to access the keyboard as desired and to perform automatic time zone changes as desired.

FIG. 3 is a block diagram showing the watch chip circuitry C/MOS 100 and the calculator circuitry P-MOS 200 in greater detail. It is understood that all operating characteristics will be further described in conjunction with additional figures. The format shown in FIG. 3 is simplified to show the interfacing, as well as to explain the common attributes of circuit and module association.

The calculator watch can be thought of as comprising three sections, all inter-related, as will be explained. The main sections are as follows:

Section 100 - WATCH OR TIMEKEEPING CIRCUITS (C/MOS)
Section 200 - CALCULATOR FUNCTION AND TIMING CIRCUITS (P-MOS)
Section 300 - TIME ZONE CONTROL It is of course understood that these sections are all coupled to one another and hence are inter-related to conserve energy or battery power and to provide common function usage where possible. The operation of FIG. 3 will therefore be explained in terms of the above sections and where common circuitry is included, the same will be indicated, reserving specific details for subsequent description.

SECTION 100 - WATCH OR TIMEKEEPING CIRCUITS

Numeral 110 references a crystal oscillator, which is capable of maintaining a frequency stability of a few parts per million per year. In general, the higher the frequency of the oscillator, the more accurate it will be. It is known to use a 32,768 Hz crystal oscillator 110 in an electronic watch. The frequency of 32,768 Hz is divisable by even integers to eventually provide the 1 Hz timing signal needed by the use of simple binary dividers. For example, 32,768 Hz divided by 512 which is a binary number, yields a frequency of 64 and 256 are binary numbers and hence 64 divided by 64 produces a 1 Hz timing signal. It is understood that for purposes of timekeeping, the frequency of the oscillator 110 is important to enable economical and simple divider circuits; namely, binary-chain multivibrator counters. The frequency of oscillator 110 could be higher as well and for example, could be a binary number such as 2, 4, 8, or 16 times the 32,768 Hz. This same stable clock can be used for the timing clock of the calculator and hence the lead 112 is shown coupled to the appropriate inputs of the calculator section 200. It is, of course, understood that since the watch circuits require the stable clock, one then has the clock circuitry for the calculator at insignificant cost. The oscillator uses C/MOS circuitry in the amplifying sections and as such, requires low power, while providing high stability and accuracy. Such circuit configurations are well-known and examples can be had by reference to "COS/MOS Integrated Circuit Manual" by RCA, Solid State Division, Somerville, New Jersey, March 1971, chapter entitled "Crystal Oscillators" on pages 138 to 148.

The divider 111 may be cascaded chain counter comprising a plurality of flip-flop or bistable C/MOS stages. As such, dividers as 111 are well-known and reference is had to the above RCA manual chapter entitled "Counters and Registers" on page 70 et seq. There is shown typical dividers and/or counting circuits which can be utilized for divider 111. An output which is a 64 Hz signal is applied to a 5 stage counter 114, which divides the 64 Hz signal to provide, at an output, a signal with a 1 cycle per second repetition rate. The 1 Hz signal is applied to an "AND" gate 115 which receives a timing gate from divider 111 to assure that valid 1 Hz transistions appear at the output of Gate 115.

The gate 115 supplies the input to a C/MOS counter 116 designated as SECOND COUNTER. The function of counter 116 is to store and to count 60 input signals (indicative of 60 seconds in a minute) and supply an output pulse for the 60th pulse and then recirculate back to the all zero mode to commence counting again. Of course, the counter 116 has stored therein the number representing the particular second count. This stored number is constantly decoded by means of typical counting decoding gates 117. The outputs of the gates 117 are applied to a driver circuit 118 to activate the appropriate display segments to allow the user to see the second display on the watch display 31 of FIG. 2A, in the last two places (s). The display 120 is a liquid crystal display and as such, requires an AC driving source.

The drive for the display is obtained from the divider 114 via inverters 121 and 122. The display drivers utilize bidirectional switches comprised of N-channel and P-channel devices, thus, again utilizing C/MOS technology. The switches are activated by the decoder outputs. When a switch is turned on, the current flows through display 120 in one direction for one half cycle of the drive waveform and reverses direction on the next half cycle. Since the switches are symmetrical, there is no apparent DC offset on the display 120.

The driving and decoding techniques, as well as the display configurations, are explained in great detail in my copending application entitled DECODER AND DRIVER CIRCUITS PARTICULARLY ADAPTED FOR USE WITH LIQUID CRYSTAL DISPLAYS, filed on Mar. 10, 1972, as Ser. No. 233,669 and assigned to Optel Corporation, the Assignee herein and now U.S. Pat. No. 3,820,108.

The output pulse of second counter 116 is applied to a minute "AND" gate 124 having another input synchronized with the 1 Hz gating signal to assure proper operation. The output of gate 124 is coupled to the input of a C/MOS minute counter 125. The function of the minute counter 125 is to count and store sixty output pulses of the second counter 116, thus manifesting minutes. The output of counter 125 is similarly decoded by decode gates 126 and used to activate the liquid crystal display segments 120 indicative of minutes and, for example, the middle two digits on display 31 of FIG. 2A (M).

Upon completing a 60 minute count, the minute counter 125 resets back to zero and provides an output pulse to the hour "AND" gate 128. Gate 128 has an output coupled to the hour counter 130. The hour counter 130 functions to count the sixty minute pulses to derive the 24 hour sequence in a day. This can, of course, be accomplished by counting 12 pulses from counter 125 and indicating AM and PM. The stored hour count existing in counter 130 is decoded by decoders 131 and used to activate the display 120 by means of the driver circuits 132. This causes the appropriate activation of the hour portion or the first two digits on the left of the display 31 of FIG. 2A (H).

The above description concentrates on the operational aspects of the electronic watch assembly. The C/MOS WATCH section 100 is powered by means of a battery 140, also designated as EB+.

The battery may be a 1.5 volt battery, and if such, the voltage is upconverted to about 15 volts by means of a converter 141. It is understood, however, that 15 volt miniature batteries are available, and hence, this source could be used directly without a converter as 141.

However, since the display 120 requires about 15 volts to achieve good contrast and brightness, the 1.5 volts is translated by converter.141. The up-converter 141 is an inductive charging circuit which is driven by a clock signal derived from the divider 111 and may operate at a 256 Hz rate. Power converters to translate voltage are well-known in the art and differ mainly in circuit configuration.

Also shown is a setting circuit 143 having outputs coupled to AND gates 115, 124 and 128, respectively.

The setting circuit operates with a push button switch 144 which operates as stem 34 of FIG. 2A, allowing the user to set the watch circuits to the correct time. Briefly, the setting circuit has a higher frequency input via divider 111. The high frequency is greater than 1 Hz and when the switch 144 is operated, the counting gates 115, 124 and 128 are supplied with a faster repetition waveshape to enable quick counting so that the user does not have to wait according to a 1 Hz rate to change the display reading.

Also shown located on the C/MOS WATCH SECTION 100 is a C/MOS calculator storage register 160, which, as will be explained, operates in conjunction with the calculator aspects of this apparatus.

SECTION 200 - CALCULATOR TIMING AND TIMING CIRCUITS (P-MOS)

The keyboard 32 of FIG. 2A consists of the above-mentioned switches as 0 to 9, C, X, ÷, (.), (+,=) and (−,=). Each switch is a miniature momentary contact switch as 201, for example, the clear switch. Basically, the calculator arrangement shown is a four function calculator. For such calculators there are two basic calculation methods and two types of calculator keyboards. One is the adding machine calculator, and the other is the algebraic calculator. The clue to identification is found in the keyboard. For the adding machine version, the keyboard, as herein shown, has a (+,=) and a (−,=) key. The algebraic machine has a separate (=), (−) and (=) key. It is understood that the description herein is based upon the adding machine format but an algebraic or other type format could be used as well and as easily.

To gain access to the calculating mode, the user depresses a momentary switch 202 which sets a flip-flop 203 to place the calculator circuitry in operation by supplying base current to transistor 205 by means of diode 204. The transistor 205 functions as transistor 20 of FIG. 1 and the emitter electrode applies power to the P-MOS calculator circuitry. The activation of the C/MOS flip-flop 203 also enables the timing generator 210 to supply clock signals for calculator operation, which input signal is obtained from the master oscillator 110. Since computation can be provided for at high rates, one could multiply the clock 110 frequency by any desired factor compatible with the particular calculator IC chip used. The keyboard switches as 201 all interface with a keyboard encoder module 211. The encoder serves to convert the particular switch closure to a binary or similarly coded number and is usually a diode or transistor matrix. Thus, the depression of any key as 0 to 9, or otherwise, is encoded into a binary or BCD number to enable arithmetic operation to occur.

The keyboard encoder 211 has a plurality of outputs, all of which interface with a ROM 212. The term ROM stands for a READ-ONLY MEMORY. This is a nonalterable or fixed program memory and contains information which is placed therein by the IC manufacturer. Essentially, the ROM 212 receives and stores the input key selections and provides the program information when a function key such as X, ÷, and so on, is depressed. The timing generator 210 supplies timing wave-trains to the circuitry to assure synchronous operation.

As above indicated, entire calculator chip assemblies, including the modules described above and to be described, are available commercially on an extremely small IC chip as the TMS-0100 from Texas Instrument, above noted. Other companies as Mostek of Carrollton, Texas, and American Micro Systems, Inc., Cal-Tex Semiconductor, Nortec Electronics and Intel Corporation, all of Santa Clara, California, supply such modules as well. These chips are smaller than a postage stamp and are in essence complete calculator circuits. See, for example, an article entitled "THAT LOWLY CALCULATOR IS TURNING INTO A VEST-POCKET COMPUTER", pages 28 to 34, Electronic Design, Vol. 21, No. 13, June 21, 1973, for examples of such chips and formats.

A calculator is basically a simple computer which is programmed to perform arithmetic operations.

The ROM 212 interfaces with a control unit 214, which unit in conjunction with the timing generator assures that all events occur in a logical sequence and at the right time. The control unit 214 receives instructions from the ROM 212 to direct it to carry out the basic algorithmic steps required by the operation.

The arithmetic unit 215 is controlled by the control unit 214 and can perform operations on numbers stored in the ROM 212 and the RAM 116. The RAM 216 is a Random Access Memory and serves as a storage during calculator operations to assure that numbers necessary for the calculation are, in fact, retained. Such a RAM unit consists of static or dynamic memory cells arranged so that each cell can be addressed directly as required and are used during the calculating operation. For example of such a memory, see an article entitled "MOS RANDOM ACCESS MEMORIES" by W. Crews in *The Electronic Engineer*, June 1970, pages 66 through 70.

Also shown under control of the ROM 212 and the RAM 216 is a FLAG SELECTOR Module 217. The flag selector 217 serves to indicate the end of a binary number to mark that number so the keyboard and program data can be handled in proper sequence. The digit timing module 219 serves to control data transfer on a digit by digit basis to assure that the input data from the ROM and RAM memories are properly stored as in the appropriate registers in the RAM 216 as further selected by the register selector unit 220.

When a sequence of calculations is complete, the RAM 216 "dumps" the result of the calculation into a DISPLAY DATA BUFFER 221. The DISPLAY DATA BUFFER 221 receives the information in a six bit storage register and decodes the information according to the six digit liquid crystal display format 120. Basically, the DATA BUFFER 221 contains information indicative of the numerical answer to the problem calculated and such information directly correlates with the characteristics of the segmented display 120. This technique is also well-known and used. As soon as the information is available, it is transferred directly from the BUFFER 221 to the low power C/MOS CAL-CULATOR STORAGE REGISTER 160, where it is directly displayed on the display 120 by means of the Driver Modules 118, 127 and 132. The completion of the calculation evidenced by the RAM 216 output, provides a trigger pulse which resets the calculator flip-flop 203 after a suitable delay. Thus, transistor 205 is biased off and power is removed from the P-MOS circuitry. In any event, the display is still activated with the numerical answer, since this is stored by the C/MOS calculator register 160.

The operation is such that calculations occur extremely rapidly, and hence, the P-MOS circuits are operational only during the keyboard access time, since the major part of the time involved is taken by the user in injecting the information or data to be operated on. The operation sequence to perform the addition, multiplication, and so on, is extremely rapid and insignificant.

As soon as flip-flop 203 is reset, a one shot multivibrator 240 is triggered to start a timing sequence. It is noted that the device used may be a C/MOS counter instead of a one shot and could be derived from one of the minute decode circuits. The one shot allows the C/MOS storage unit 160 to retain the answer for a suitable period, say 15 seconds, and then resets the storage 160 and places the apparatus back into the watch format. Thus, at the end of the calculations and after a 15 second display of the result, the display 120 again indicates time of day.

While the above description shows energization of the P-MOS calculator 200 for the time of setting flip-flop 203, it is understood that the flip-flop can be also controlled by the control unit 214, and hence one need only energize the ROM 212, timing generator 219, and register select 220, until the user presses a function key as X, ÷, and then the remainder of the calculator assembly is activated by means of an additional control circuit; thus further conserving power.

Figure 4:
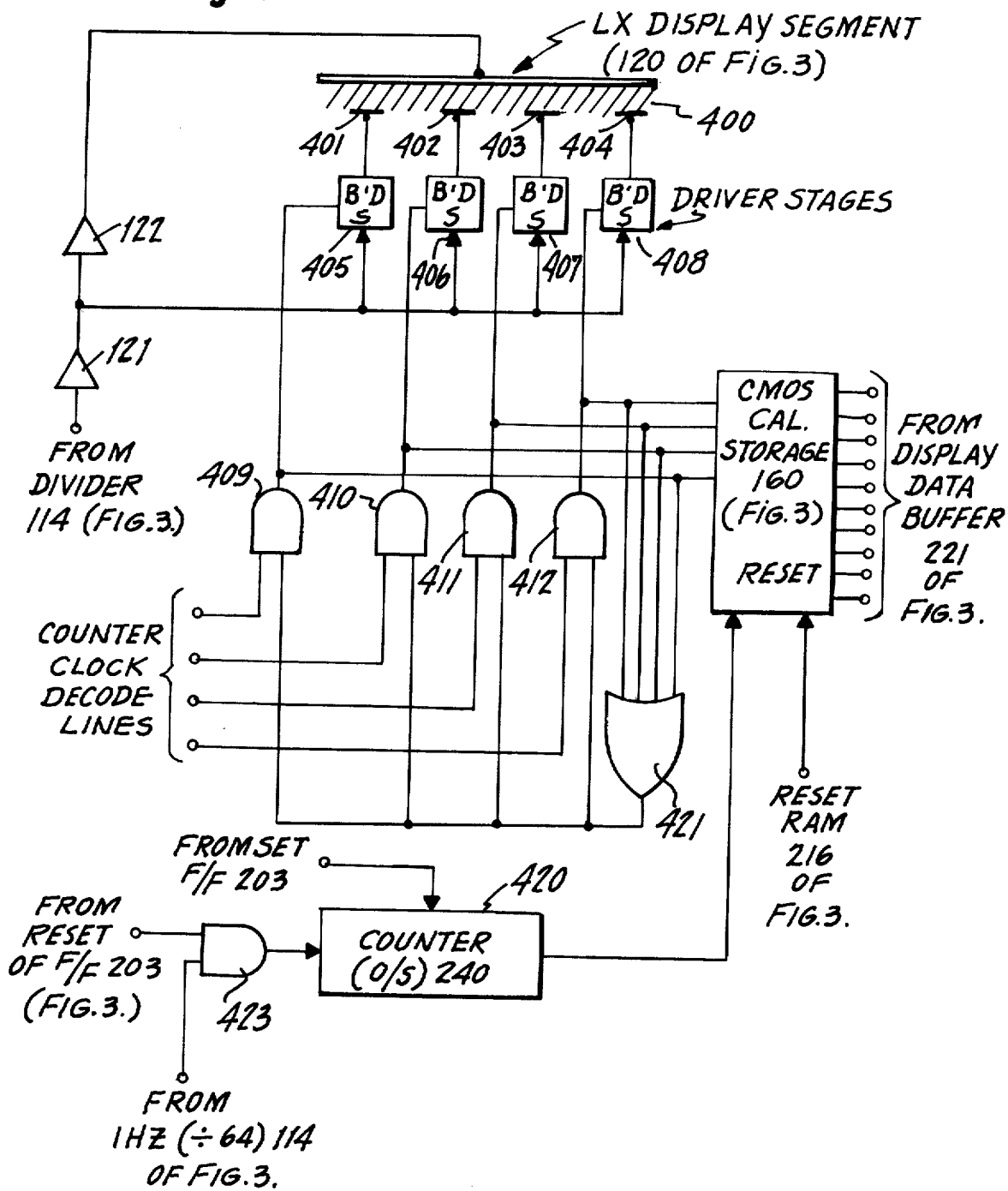
FIG. 4 is a block diagram useful in explaining the display driving circuits and operation for the watch and calculator modes.

Referring to FIG. 4, there is shown a more detailed diagram in logic format of the calculator watch display modes.

A portion of the liquid crystal display 120 is shown. The display has a liquid crystal material 400 sandwiched between two pieces of glass or insulator, with conductive terminals deposited thereon. The segment electrodes 401 and 404 are oriented to provide upon activation, the numerical indication desired. See the above noted application, Ser. No. 233,669, for the exact segment configurations and format. Each segment is driven by a bidirectional switch 405 to 408 (BDS), as indicated above, which are complementary MOS or C/MOS devices. The display 120, as indicated, is driven by an AC signal derived from the output of the invertor 122 coupled to the common terminal of the liquid crystal display and the output of invention 121 coupled to the common input terminal of the bidirectional switches 405 to 408. The inputs to the switches are obtained via AND gates 409 to 412. Hence, when there is a positive level at the input of any gate 409 to 412, that gate will turn on the bidirectional switch and activate the appropriate segment. This is normal clock or watch operation, as shown by the above noted application.

As indicated in the description of FIG. 3, when an end of calculation (EOC) signal is provided by RAM 216, the result of the computation is transferred to the C/MOS calculator storage module 160 and flip-flop 203 is reset.

At this point it is noted that during calculator operation the RAM is continuously loading information into the storage register 160. For example, the user desiring to perform a computation sets flip-flop 203 via switch 202. The setting of 203 resets the counter or one shot 420 to all zeros'. Each time the RAM 216 places data in the DISPLAY DATA BUFFER 221, the output is transferred to the CAL-STORAGE 160 and is displayed. Assume the user presses the first few keys to place the number 100 in the ROM 212. This number will be displayed as the RAM 216 will load the Buffer 221 and, hence, the CAL-STORAGE 160. The user will then add 75 to this and this will also appear on the display, but when the (+) sign is implemented, the calculation is complete and the EOC signal will be generated, thus attempting to reset F/F 203. It is noted that the "OR" gate 421 is activated every time any state or content of the C/MOS CAL-STORAGE 160 is not zero, thus acknowledging that information is present and should be displayed. The "OR" gate inhibits the clock gates 409 to 412 and the leads from the C/MOS CAL-STORAGE 160 operate the bidirectional switches 405 to 408 directly. It is also noted that flip-flop 203 is also set from the keyboard to enable the user to perform large additions as 7 + 8 and N without resetting the F/F 203.

In any event when F/F 203 is reset, the counter 420 is operated by AND gate 423. One input is from flip-flop 203 and the other is, for example, the 1 Hz timing signal. The counter is a binary type and can be made to count to 16, for example, and then reset the C/MOS calculator storage 160 to all zeros, thus removing the calculator answer display and restoring the clock data.

Hence, the display will indicate the calculating steps as does any ordinary calculator, until a final answer is achieved, at that time the answer is displayed for 15 seconds more or less and then automatically erased, to further conserve power.

Thus, the C/MOS calculator storage 160 is reset for an EOC or end of calculation signal, it could also be reset upon command from the RAM 216 in order to display digits as entered and so on.

The control of flip-flop 203 will now be explained in greater detail by referring to FIG. 5.

As indicated when the user desires to use the calculator section, he depresses the C.M. or Calculator Mode Switch 500. (Switch 202 of FIG. 3). The switch 500 is a momentary switch and closing the contacts sets the flip-flop 203. The setting of the flip-flop 203 causes the base electrode of transistor 505 to be forward biased, thus directing current from the power convertor or power supply 506 to the P-MOS calculator circuit section 200.

The diode 507 serves to prevent coupling when transistor 505 is biased off and to prevent leakage when the calculator mode is not accessed.

The flip-flop 203, when set, also resets the timeout counter 520 (420 of FIG. 4), to all zeros and prevents the same from counting during this mode. The C/MOS calculator storage register (160 of FIG. 3), is also at the all zero state due to the fact that it has been previously reset.

The user, thus placing the unit in the calculator mode by the setting of F/F 203, proceeds to access the keyboard by means of the rod 33 (FIG. 2).

As he enters his numbers and presses a function switch, the data so entered is displayed on the display due to its transfer into the C/MOS storage 160 as above explained.

As shown, the resetting of the flip-flop 203 or the termination of the calculator mode is under the control of the end of the calculation signal (EOC) from RAM 216 and can also be controlled by the ROM 212.

In any event, the flip-flop 203 cannot be reset until after a pre-determined time delay afforded by two one-shot circuits 510 and 511 in cascade.

While one-shots or monostables are shown for the sake of clarification and simplicity, one may use a counter in place thereof, operating as the TIMEOUT counter 420 of FIG. 4. This is preferable, as due to the C/MOS WATCH section 100, one has all the necessary time delays needed as afforded by the waveforms produced by the hour, minute, and second counters and their associated decoding gates. In any event, one desires a suitable time delay to occur before one resets flip-flop 203.

The reason for this is inherent in calculator operation. For example, the user may wish to add, subtract, multiply, or divide a great number of figures. Using addition, as an example, each time he presses the (+) or add key, that is a completion of function and an EOC signal is generated. This signal causes the one shots to trigger and to commence the end of calculating mode timeout, which is conditioned upon the resetting of flip-flop 203.

In any event, the time delay afforded by the one-shots may be between 2 to 20 seconds or any reasonable time desired, to assure that if the user accesses the keyboard again, the AND gate 520 will cause the flip-flop 203 to remain set. The keyboard activate signal is supplied by the encoder 211 of FIG. 3 and overlaps the timing period of the one-shots 511 and 510 to avoid a resetting. The "OR" gate 521 assures that a keyboard activation during any of the one-shots timing will keep the F/F 203 set.

The ROM 212 can also serve to reset the flip-flop 203 to terminate the calculator mode for invalid commands as dividing by zero and so on.

When the user is finished calculating, he will not depress the keyboard, and hence, flip-flop 203 will reset. The resetting of the flip-flop 203 serves to remove power from the P-MOS calculator circuits 200 by reverse biasing transistor 505. The contents of the last calculation have already been transferred to the C/MOS storage unit 160 and this is still displayed as explained.

The inhibit is removed from the timeout counter 420 and the AND gate 503 is enabled to permit the TIMEOUT counter to count 1 Hz pulses for a given, predesired period, say 15 seconds. At the end of this period, the timeout counter resets the C/MOS STORAGE 160 and the time of day, as continuously monitored by the C/MOS watch circuitry 100, is displayed as above described.

SECTION 300 - TIME ZONE CONTROL

Since the calculator watch includes a keyboard, as indicated, one can obtain time zone change with a slight increase in cost. Referring to FIG. 6A, there is shown a table using Eastern Standard time (New York) as a reference. Column A lists various famous cities throughout the world, while column B gives the time difference therebetween. For example, at 1:00 p.m. in New York, it would be 2:00 p.m. in Buenos Aires and 10:00 a.m. in San Francisco.

A table such as this could be engraved on the back of the watch case or included with the instrument in a pamphlet.

The TIME ZONE CONTROL is activated by switch 301 (FIG. 3) and is accessed directly by the keyboard. Column C indicates the calculator key to be depressed on the keyboard for the time zone change.

Thus, depressing the key marked "4" would decrease the New York time by 4 hours to obtain Juneau, Alaska, time. If one then depressed key "0" thereafter time would be increased by 4 hours.

Figure 7:
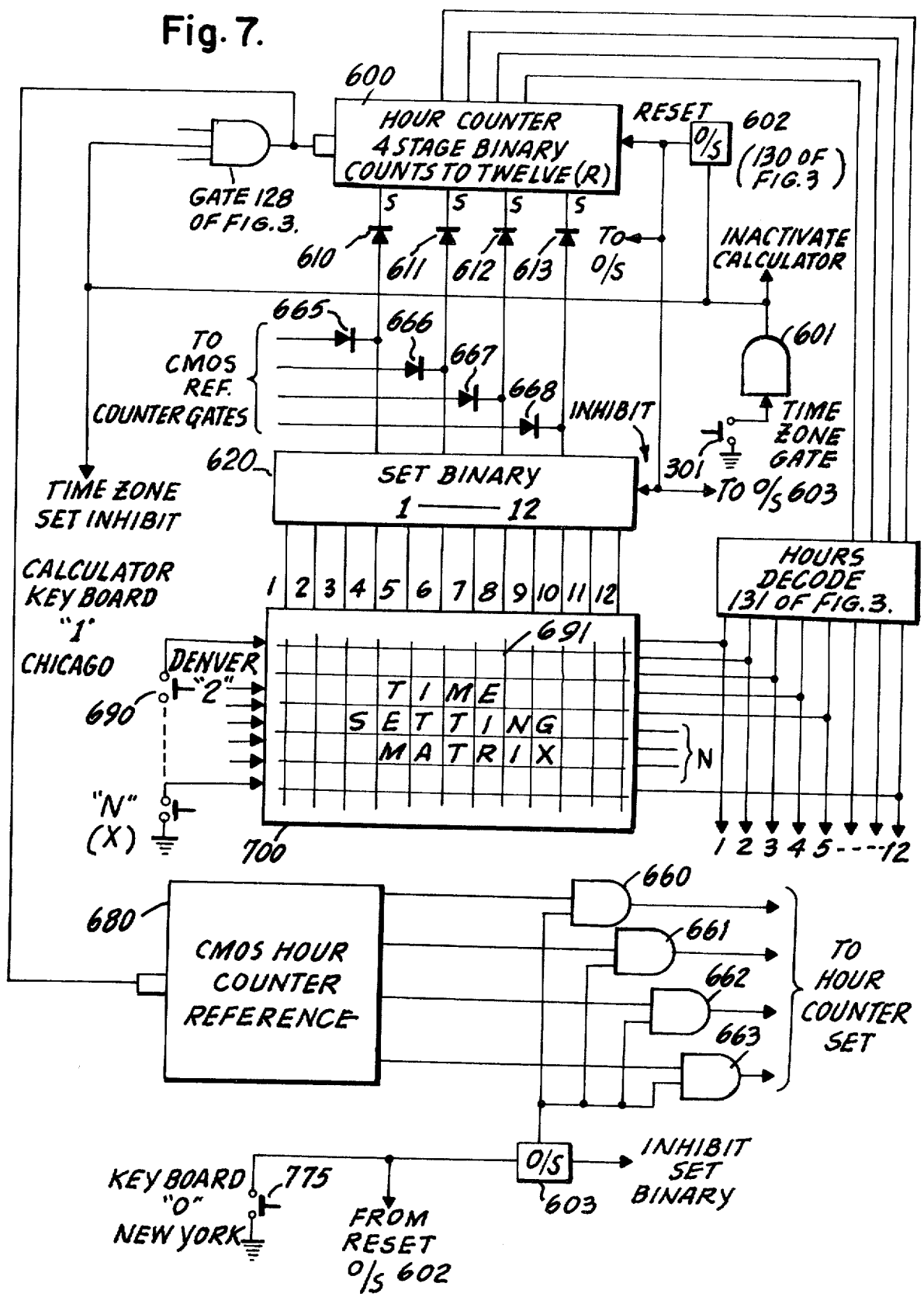
FIG. 7 is a block diagram showing the details of time conversion operation and logic circuitry.

FIG. 6B shows a full time chart indicating the TIME (AM or PM) from 12:00 to 12:00 as the ordinate and the time difference as the abscissa. The numbers in the rows and columns are binary numbers, recognizing that the decimal values, one through twelve, can be represented by binary numbers 0000 through 1011. It is noted that for simplicity, a straight binary code is used with all zeros representing 12:00 o'clock, but any code can be used as long as the same provides twelve unique states. Referring to FIG. 7, there is shown a 4 stage binary counter 600, which is the hour counter 130 on the C/MOS chip. The counter counts in binary from 0000 to 1011 to indicate the hours from 12:00 to 11:00. Each binary count provided for is decoded by typical AND gates and is used to drive the appropriate display segments as indicated in FIG. 3. The decode 131 serves this function, and hence, the exact count or hour is always known and is available from decode 131. The leads emanating from decode 131, indicate this fact and are labelled 1 to 12 to indicate the 12 p.m. or a.m. hours.

When the user moves into a different time zone, he pushes in switch 301, this places a ground on the time zone gate 601, and inhibits clock inputs to the hour counter via gate 128. The user has to be instructed that a time zone change should be accomplished between hours and not directly on the hour to prevent a blockage of a legitimate advance hour pulse from gate 128 (FIG. 3). This is simple as one has at least 58 or more minutes to complete this action. The gate 601 can further disable the calculator in numerous ways to avoid a computation mode. This means can be accomplished by activating the calculator clear key or reverse biasing transistor 205 of FIG. 3. Time zone circuits can be C/MOS circuitry as they are rarely used and most of the components already exist in the C/MOS watch section 100.

As can be ascertained by the Table of FIG. 6B, every translation is represented by one of twelve binary numbers, and hence, the counter 600 can be set by means of the setting diodes 610, 611, 612, and 613 to any state shown on Table 6B.

Module 620 is a simple matrix which converts the input command to the required binary setting for the hour counter 600.

Now assume a user is traveling from New York to Chicago. He wishes to change time automatically and thus pushes in switch 301 at say 10:15:10, which is 10 hours 15 minutes and 10 seconds (AM or PM).

The seconds and minutes continue to update and there is no inhibit upon these counters, the hours will not update due to the inhibit on gate 128, but the user has 45 minutes to accomplish he change. He then pushes key No. 1 on the calculator keyboard (See FIG. 6A). The setting of switch 301 accomplishes the following sequence.

Gate 601 is enabled and gate 128 is immediately inhibited. A one shot 602 is triggered which immediately resets the hour counter 600 to all zeros. Shown below and located on the C/MOS chip is a C/MOS HOUR COUNTER Reference 680. This counter is identical with hour counter 600 and is driven and updated by the same gate 128 and is completely synchronous with the hour counter. Thus, in the above example, the counter 680 would contain the digital reference count manifesting 10:00 o'clock.

As previously indicated, New York or Eastern Standard Time is the reference and this time is always maintained in Counter 680 independent of the display except when the display is indicating New York time. The activation of gate 601 triggers the one-shot 602 which resets the hour counter 600 to all zeros, the one-shot 602, after completing its period, triggers one-shot 603. Both one-shots 602 and 603 inhibit the set binary module 620 to prevent a setting of the hour counter during the timing waveforms of these one-shots. The one-shot 603 enables the gates 660, 661, 662 and 663. The other input of the gates is from the output of counter 680, which is the binary New York time.

This time is set into counter 600 via the diodes 664, 665, 666 and 667. In this example, counter 600 and counter 680 contained the same hour count as the user was on the reference New York time. So at the end of O/S 603 period, the hour counter 600 has stored therein the binary count indicative of the 10th hour.

The user presses the keyboard switch "1" labelled as 690. This switch is an input to a TIME SETTING MATRIX 700. MATRIX 700 is fabricated as a simple diode or cross-point matrix and according to Table 6B. The inputs on the left are those shown in the diagram 6B as TIME DIFFERENCE and indicative of the cities listed in Column A (PLACE) of FIG. 6A. The inputs to the matrix on the right are the hour decode directly from decode 131 or the outputs 1 to 12 o'clock. Thus, when switch "1" is depressed, there is one intersection in the matrix 700. This intersection occurs at the crosspoint between the first row 701 and the hour line input 10.

From the Table of 6B, since the New York time was 10:00 AM/PM and the Chicago switch "1" was depressed, it is known that the time to be inserted into counter 600 is binary 1001 or 9:00 o'clock. The cross point 691 is the only activated one and causes the output lead 9 of the matrix 700 to energize, thus causing the binary set 620 to set the counter 600 to 1001 or Chicago time.

The user then releases switch 301 and his watch is automatically set for Chicago time.

This happens almost instantaneously and the user, upon depressing switch 301 and thence keyboard key "1", would see the hour count change by one. The clock then continues to count normally via gate 128 and chicago time is maintained.

The counter 680 is updated via gate 128 but still contains New York time as this is the reference for this example. It is, however, understood that any time zone can be the reference count, merely by setting counter 680 with that information and using the particular city or zone as the reference.

Thus at the end of the time zone set the user's watch displays the Chicago time or in this example say 9:15:25. It is noted that the seconds have changed and, in fact, the time required to accomplish the above sequence is only dependent upon the user's ability to press the two keys 301 and 690; as logic implementation is in milliseconds or microseconds.

Now assume the user wishes to set his watch from the Chicago setting to London time. It is noted that he is always on a New York reference. Say the Chicago time or the display reads 6:10:10 or 6 hours, 10 minutes, and 10 seconds. The reference counter, of course, contains New York time in regard to the hour, and hence, counter 680 has stored therein the binary number 0111 indicative of the 7th hour.

Upon setting switch 301, the following events occur in sequence:
1. Counter 600 is reset to all zeros via one-shot 602.
2. Gate 128 is inhibited, thus preventing counters 600 and 680 from up-date.
3. One-shot 602 as triggered, also inhibits the set binary module 600.
4. One-shot 603 is triggered after one-shot 602 completes the resulting inhibiting cycle.
5. One-shot 603 enables gates 660 and 663 and sets counter 600 to New York reference time; namely, in this example, to 0111 or the 7th hour.
6. After the one-shot 603 period, the set binary module 620 is enabled.
7. The hour decode now decodes "7" and that time input lead of matrix 700 is energized. The user has depressed the London keyboard switch "9" (Table 6A, Column A and C).

That line or input to the matrix 700 is also energized and from Table 6B it is seen that for a 7:00 New York time, the London setting is 0000 or 12:00 indicating the plus five hour difference. Hence, one cross-point in matrix 700 is energized (denoting London + 7:00 hours with New York time).

The output lead of matrix 700 designated as 12 is energized by this cross-point, thus causing the set binary module to set the hour counter 600 to the 12:00 hour display position.

Assume now the user wished to place the watch display back to New York time after the above setting. He would again push in or set, switch 301 and then keyboard key "0". In this event, the New York key or the "0" key 775, is not part of the matrix 700. There is therefore no matrix output and module 620 cannot set the clock. But switch "0" or 775 serves to trigger the O/S 603 again to assure that the transfer of the contents of the counter reference 680 is transferred via gates 660 to 663 into the hour counter 600 and thus depressing the key "0" will set the watch to New York time independent of any previous setting. It is also noted that upon depressing of switch 301 and then failing to push a keyboard switch, the watch is always reset to New York time.

It is noted that the time zone circuitry described only requires the matrix 700, which is a passive diode network, the counter reference 680, the one-shots 602 and 603 and gate 601.

These units require practically no space and consume negligible power. The gates and one-shots can be obtained from free or unused "chip" components or can be time-shared and need not be repeated. The counter reference 680 is only four stages.

There are, of course, numerous other ways of implementing time zone change with a keyboard as included in a calculator watch assembly, such as by binary adders and subtractors, which would add the required hours to the contents of the hour counter 600 or counter reference 680. Thus, one would add binary five to New York time to obtain London time or subtract binary 2 from New York time to obtain Denver time.

The main feature being that a user can perform time zone changes without thought and calculation, merely by accessing a keyboard. It is further noted that the setting procedure associated with the setting circuit (143 of FIG. 3) is always available and can be utilized in conjunction with the above or alternatively thereto.

The time zone feature is simple to implement, inexpensive and consumes little power.

While the above specification discloses a low power timekeeping circuit and a higher power calculator circuit, where the respective circuits are controlled to share power according to the operating mode, it can readily be understood by one skilled in the art, that the technique is suitable and useful for a plurality of chips. For example, one might form a calculator or any other function by using two or more secondary chips. Each such chip would then be controlled by the timekeeping or by the main chip which determines when power is to be applied or removed. The secondary chips can also control one another once controlled by the main chip.

Thus, it is understood that the main advantage and aspect of this invention is to enable one to use sophisticated circuitry from a relatively low power source, as a battery, while substantially extending battery life because of the time-controlled features of this invention.

It is also clear that while the discussion centered about C/MOS and P-MOS circuits, any combination or sole use of these circuits could be implemented and one would still gain the advantage of this invention.

I claim:
1. An electronic calculator watch apparatus of the type including a digital display capable of directly displaying a given number of digits, comprising:
   a. a power source for energizing electronic circuitry;
   b. a source of stable oscillations for providing at an output, an accurate frequency reference signal;
   c. a time-keeping circuit responsive to said reference signal for providing at an output, a signal capable of being displayed and indicative of the time of day;
   d. a selectable timing and calculator circuit responsive to said reference signal to provide a series of timing waveshapes adapted to aid in performing algorithmic operations under control of numerical inputs furnished by an input entry means included in said calculator circuit;
   e. switching means coupled to said timing and calculating means and responsive to the selection of said calculator circuit for coupling said power source to said calculator circuit only upon selection of the same, whereby power is dissipated by said calculator section only during a predetermined time necessary to perform said operation, said switching means including a transistor having a collector electrode, a base electrode and an emitter electrode, with said collector to emitter electrode path coupled between a power terminal of said calculator chip and said power source to energize said calculator chip during said predetermined time, said base electrode coupled to means for selecting said calculator circuit.

2. The calculator watch apparatus according to claim 1, wherein said timekeeping circuit is an integrated circuit chip fabricated with C/MOS devices.

3. The calculator watch apparatus according to claim 1, wherein said calculator circuit is an integrated circuit chip fabricated with P-MOS devices.

4. The electronic calculator watch apparatus according to claim 1, wherein said source of stable oscillations is a C/MOS quartz oscillator circuit.

5. The electronic calculator watch apparatus according to claim 1, wherein said input entry means associated with said calculator circuit is a keyboard comprising a plurality of switches manifesting the digits 0 through 9 and at least one key manifesting an algorithmic function.

6. The electronic calculator watch according to claim 1, wherein said power source includes a battery.

7. An electronic calculator watch apparatus of the type employing a direct reading digital display format for indicating, during a time-keeping mode, a numeral indicative of the time of day and during a calculating mode, a different numeral indicative of a calculation, comprising:
   a. a keyboard assembly comprising a plurality of switches manifesting the digits 0 through 9 and at least a single key manifesting an algorithmic function;
   b. a source of stable oscillations capable of providing, at an output, an accurate frequency signal;
   c. a time-keeping section adapted to provide an indication of the time of day and having an input coupled to said stable source of oscillations and means included therein adapted to derive said time of day in response to a counting operation indicative of said accurate frequency of said stable source, said time-keeping circuit having an output operative to activate said display to enable a user to view said time of day on said display during a first mode;
   d. a selective calculator section coupled to said keyboard and operative to perform under control of said keyboard, the algorithmic function indicated, said calculator section operative to provide an output indicative of the result of said function performed and capable of being displayed on said display during a second mode;
   e. means coupling said outputs of said time-keeping and calculator sections to said display for permitting said calculator output to be displayed for a predetermined time during said calculator mode and said time-keeping output to be displayed whenever said calculator output is not displayed, and
   f. switching means including a semiconductor switch coupled to said calculator section and operative to energize the same during a selected calculator mode, said semiconductor switch having a control electrode adapted to activate said switch upon application to said electrode of a control voltage.

8. The electronic calculator watch apparatus according to claim 7, wherein said time-keeping section is a C/MOS integrated circuit chip.

9. The electronic calculator watch apparatus according to claim 7, wherein said calculator section is a P-MOS integrated circuit chip.

10. The apparatus according to claim 8 further comprising:
   a. a time circuit having a plurality of inputs, each one coupled to a selected one of said keyboard assembly switches;
   b. a time setting matrix having one series of inputs each of which is associated with a separate one of said switches and indicative of a desired time zone difference as compared to a reference zone, and a second series of inputs responsive to the time of said reference zone; and
   c. means coupling said time-keeping section to said matrix to change the time of day according to the selection of one of said keyboard switches from said reference zone to any selected one of said desired zones as selected by said switches.

11. An integral calculator watch apparatus of the type employing a low dissipation direct-reading digital display said calculator watch assembly including a stable frequency source and low power dissipating time-keeping circuitry operative to monitor said source to provide, at an output, a numerical indication of the time of day for display on said digital display and a higher power dissipating calculator circuit of the type capable of performing algorithmic functions and to provide, at an output, a numerical indication of the result of said function also for display on said digital display, in combination therewith apparatus for sharing said display, comprising:
   a. a plurality of driver circuits having outputs coupled to said display digits and capable of activating any one of a plurality of display numerals, said drivers each having an input which is adapted to receive an unput signal for operating the same according to any numerical display desired; and
   b. control means capable of operating in a first and second mode, said control means having an output coupled to said driver circuits and operative to activate said drivers with said time of day display during said first mode, and to display said calculator output function during said second mode, said control means including a settable bistable circuit capable of operating in a first state indicative of said time-keeping operation and said first mode and in a second state indicative of said calculator mode and said second mode, and means including a momentary switch coupled to said bistable to operate the same upon said switch closure in said second state indicative of said second mode.

12. The calculator watch according to claim 11, wherein said low dissipation direct reading digital display is a segmented liquid crystal display.

13. The calculator watch according to claim 11, wherein said low power dissipating time-keeping circuitry is a C/MOS integrated circuit time-keeping chip.

14. The calculator watch according to claim 11, wherein said higher power dissipating calculator circuit is a P-MOS integrated circuit chip.

15. The calculator watch according to claim 11, wherein said driver circuits include a plurality of C/MOS bidirectional switches.

* * * * *